(12) United States Patent
Labbe et al.

(10) Patent No.: US 9,350,208 B2
(45) Date of Patent: May 24, 2016

(54) ELECTRICAL MACHINE COMPRISING ROTOR PROVIDED WITH WINDING FACILITATING SWITCHING, AND ASSOCIATED STARTER

(75) Inventors: Nicolas Labbe, Lyons (FR); Aurélien Vauquelin, Saint Maur des Fosses (FR); Benoit Dupeux, Oyeu (FR)

(73) Assignee: Valeo Equipements Electriques Moteur (FR)

( * ) Notice: Subject to any disclaimer, the term of this patent is extended or adjusted under 35 U.S.C. 154(b) by 598 days.

(21) Appl. No.: 13/641,524

(22) PCT Filed: Apr. 20, 2011

(86) PCT No.: PCT/FR2011/050904
§ 371 (c)(1),
(2), (4) Date: Feb. 15, 2013

(87) PCT Pub. No.: WO2011/135233
PCT Pub. Date: Nov. 3, 2011

(65) Prior Publication Data
US 2013/0134822 A1 May 30, 2013

(30) Foreign Application Priority Data

Apr. 27, 2010 (FR) ..................................... 10 53227

(51) Int. Cl.
*H02K 3/48* (2006.01)
*H02K 23/32* (2006.01)
*H02K 23/38* (2006.01)

(52) U.S. Cl.
CPC .................. *H02K 3/48* (2013.01); *H02K 23/32* (2013.01); *H02K 23/38* (2013.01)

(58) Field of Classification Search
CPC ......... H02K 23/38; H02K 23/32; H02K 3/48; H02K 15/085
USPC .................................... 310/216.001, 207, 233
See application file for complete search history.

(56) References Cited

U.S. PATENT DOCUMENTS

| 3,989,969 | A | * | 11/1976 | Lazaroiu et al. | 310/268 |
| 4,833,769 | A | * | 5/1989 | Tomite et al. | 29/597 |
| 4,876,472 | A | * | 10/1989 | Shiraki et al. | 310/198 |
| 5,187,858 | A | * | 2/1993 | Murakoshi et al. | 29/596 |
| 6,064,136 | A | * | 5/2000 | Kobayashi et al. | 310/270 |
| 6,140,732 | A | * | 10/2000 | Morimoto et al. | 310/195 |

(Continued)

FOREIGN PATENT DOCUMENTS

| EP | 1487090 | 12/2004 | |
| FR | 2547683 A1 | * 12/1984 | ............. H01R 39/32 |

(Continued)

*Primary Examiner* — Alex W Mok
(74) *Attorney, Agent, or Firm* — Berenato & White, LLC

(57) ABSTRACT

A machine having a wound rotor (102) comprising a manifold (112) that includes a set of blades (131) and longitudinal notches (133). Rotor (102) also comprises a winding (108) formed of a set of conductors (134) that each comprise two arms (135.1, 135.2), connected together by a base (136). The curve, representing the electromotive force (EMF) generated by the rotor (102) on the basis of the angle of rotation of the rotor, is linear and steep in a switching region, and the notches (133) are angularly shifted relative to the blades (131) so that each notch (133) is located opposite a junction between two blades. The machine may relate to a starter fitted with the machine.

8 Claims, 6 Drawing Sheets

(56) References Cited

U.S. PATENT DOCUMENTS

| | | | |
|---|---|---|---|
| 6,800,980 B2 * | 10/2004 | Kuenzel et al. | 310/234 |
| 7,560,848 B2 * | 7/2009 | Roos et al. | 310/234 |
| 2003/0193257 A1 * | 10/2003 | Kamei et al. | 310/207 |
| 2004/0100160 A1 * | 5/2004 | Potocnik | 310/236 |
| 2008/0231139 A1 * | 9/2008 | Kumar | 310/233 |
| 2009/0009023 A1 * | 1/2009 | Weigold et al. | 310/198 |
| 2009/0146525 A1 * | 6/2009 | Nakano et al. | 310/234 |
| 2009/0315426 A1 * | 12/2009 | Kawashima et al. | 310/195 |
| 2010/0101879 A1 * | 4/2010 | McVickers | 180/65.51 |

FOREIGN PATENT DOCUMENTS

| | | | |
|---|---|---|---|
| FR | 2639163 A1 * | 5/1990 | H02K 3/51 |
| FR | 2817678 | 6/2002 | |
| FR | 2838574 | 10/2003 | |

* cited by examiner

ELECTRICAL MACHINE COMPRISING ROTOR PROVIDED WITH WINDING FACILITATING SWITCHING, AND ASSOCIATED STARTER

CROSS-REFERENCE TO RELATED APPLICATIONS AND CLAIM TO PRIORITY

This application is a national stage application of International Application No. PCT/FR2011/050904 filed Apr. 20, 2011, which claims priority to French Patent Application No. 10/53227 filed Apr. 27, 2010, of which the disclosures are incorporated herein by reference and to which priority is claimed.

FIELD OF THE INVENTION

The invention relates to an electrical machine comprising a rotor provided with a winding which has a configuration to facilitate the electric switching in the conductors of the rotor. The invention has a particularly advantageous application in the field of motor vehicle starters.

PRIOR ART

Motor vehicle starters are known which implement rotary electrical machines provided with a stator or inductor, comprising a plurality of permanent magnets or wound poles (electromagnets) and a rotor 102 or armature, comprising conductors which form the winding of the rotor provided with a body with a cylindrical form. An air gap exists between the outer periphery of the body of the rotor and the inner periphery of the magnets of the stator.

For this purpose, as shown in FIGS. 5 and 6, the rotor 102 comprises a collector provided with electrically conductive plates 131, such as copper plates, which extend side by side on its outer periphery. The rotor 102 also has longitudinal notches 133 which are provided in its body, consisting of a set of metal plates. In order to form the winding, conductors 134, the ends of which are welded on a part of each plate 131, are inserted inside notches 133. In the example in FIG. 1, the collector comprises 25 plates which are numbered from 1 to 25, and a corresponding number of notches. In this known configuration, the axis of the notches 133 coincides with the axis of the plates 131, i.e. the plates 131 are opposite the notches 133. The stator comprises six poles in the form of permanent magnets or wound poles which are distributed in an alternating manner, i.e. three poles of the North type and three poles of the South type. As a variant, the stator comprises only four poles (2 poles of the North type and 2 poles of the South type, alternately).

More specifically, each conductor 134 has two arms 135.1, 135.2 which are connected by a base such as to form a "U". These conductors 134, the ends 137.1, 137.2 of which are welded on the plates 131, are inserted inside notches 133 of the rotor on two distinct layers, i.e. the upper layer and the lower layer.

The machine also comprises brushes which are designed to permit the electrical supply of the rotor by switching of the electric current in the conductors of the rotor 102.

The distance between the two arms 135.1, 135.2 of a single conductor 134 at the level of the notches 133 is known as the notch pitch k. If one of the arms 135.1 is engaged inside the notch N, and the other one 135.2 is engaged in the notch N+k, the notch pitch is equal to k. In other words, the notch pitch k is equal to the number of notches 133 which separate the two notches 133 which receive the arms 135.1, 135.2 of a single conductor 134 plus one. For example, for a configuration in which an arm 135.1 is engaged in the notch situated opposite the $3^{rd}$ plate, and the other arm 135.2 is engaged in the notch situated opposite the $7^{th}$ plate, the notch pitch k is equal to 4 (cf FIG. 1).

Similarly, the distance between the two ends 137.1, 137.2 of a single conductor 134 at the level of the plates 131 is known as the plate pitch 1, or pitch at the collector. If one of the ends 137.1 of the conductor is welded on the plate M, and the other one 137.2 is welded on the plate M+1, the pitch of the plate is equal to 1. In other words, the plate pitch 1 is equal to the number of plates 131 which separate the two plates 131 onto which there are welded the ends of a single conductor plus one. For example, for a configuration in which an end of the conductor is welded on the $1^{st}$ plate, and the other end is welded on the $9^{th}$ plate, the plate pitch 1 is equal to 8 (cf FIG. 1).

The rules of the conventional art lead to winding of the rotor 102 according to the number of poles of the stator, in order to obtain the electromotive force required, which, for a configuration of a stator with 6 poles corresponds to a notch pitch k of 4 and a plate pitch 1 of 8 (cf FIG. 1). In this configuration, if an end 137.1, 137.2 of a conductor 134 is welded on the plate N, one of its arms 135.1, 135.2 passes into the notch 133 situated opposite the plate N+2, and its other arm 135.1, 135.2 passes back into the notch 133 situated opposite the plate N+6, and the other end 137.1, 137.2 will be welded, on the plate N+8.

However, a configuration of this type is not optimum in terms of switching. In fact, as shown in FIG. 2a, the electromotive force generated by the winding produced according to the aforementioned configuration (k=4; 1=8) has a stage P at which there is situated a point of inflection S in a switching area. This form of curve has an effect on the quality of switching, and it may be necessary to offset the inductor by several degrees relative to the brushes (and vice versa) in order to assist the switching by means of an electromotive force which accelerates the inversion of the current in the conductors of the rotor which are being switched.

It will be noted that with a profile of electromagnetic force or induction with a stage P in the interpolar region, when going from an "off-load" state to a "charging" state, conventional corrective angular offsetting in order to improve the switching leads to an induction profile, the level of amplitude of which in the switching region is suddenly increased, instead of being adjustable linearly, and therefore in a facilitated manner, as by means of the invention.

OBJECT OF THE INVENTION

For this purpose a wound rotor is produced, the electromotive force curve of which has an abrupt linear gradient without a point of inflection in the switching area.

With the same stator inductor as that of the machine according to the prior art, a curve of this type makes it possible to generate electromotive forces which facilitate the switching at the level of the conductors of the rotor, preferably provided that angular offsetting is carried out.

In order to obtain this profile with a configuration with 6 poles and 25 notches, the notch pitch k is modified and is equal to either 3 or 5, whereas the plate pitch 1 is unchanged relative to the known configuration (1=8).

The invention thus relates to an electrical machine comprising a wound rotor:
 a collector comprising a set of plates which are designed to enter into co-operation with brushes;

notches which are provided longitudinally on the outer periphery of the rotor; and a winding which is formed by an assembly of conductors, each conductor comprising two arms and two ends, these two arms being connected to one another by a base; the arms of a single conductor being introduced into the notches according to a notch pitch k;

the ends of a single conductor being welded on the plates according to a plate pitch 1;

characterised in that:

the curve which represents the electromotive force EMF generated by the rotor according to the angle of rotation of the rotor has an abrupt linear form without a point of inflection in a switching region;

and in that the notches are offset angularly relative to the plates, such that each notch is situated opposite a junction between two plates.

According to one embodiment, the abrupt linear form of the curve is characterised by a gradient of between 1.5 and 100 times the amplitude of the electromotive force signal, according to the angle for pi radians of variation of angle.

According to one embodiment, it additionally comprises:

a stator comprising a magnetised structure with permanent or induced magnetisation which extends according to a circumference of the stator;

brushes which are designed to permit the electrical supply to the rotor by switching of the electric current in the conductors of the rotor;

the stator being offset angularly relative to the brushes.

According to one embodiment, the angular offsetting is between 1 and 45 electric degrees.

According to one embodiment, for a configuration with 6 poles and 25 notches, the notch pitch k is equal to 3 or 5, and the plate pitch 1 is equal to 8.

According to one embodiment, each conductor of the winding has radial symmetry relative to a radius of the rotor, known as the radius of symmetry.

According to one embodiment:

the angle formed by the radius of symmetry and the radius of the rotor which passes via the transverse cross-section of an arm of the conductor is equal to the angle formed by the radius and the radius of the rotor which passes via the transverse cross-section of the other arm of the conductor; and the angle formed by the radius of symmetry and the radius of the rotor which passes via the transverse cross-section of one of the ends of the conductor is equal to the angle formed by the radius and the radius of the rotor which passes via the transverse cross-section of the other end of the conductor.

According to one embodiment, for winding which has a notch pitch k of 3 and a plate pitch 1 of 8, if one end of a conductor is welded on the plate N, one of its arms passes into the notch situated between the plates N+2 and N+3, and its other arm passes back into the notch situated between the plates N+5 and N+6, the other end being welded on the plate. N+8.

According to one embodiment, for the winding configuration which has a notch pitch k of 5 and a plate pitch of 8, if one end of a conductor is welded on the plate N, one of its arms passes into the notch situated between the plates N+1 and N+2, and its other arm passes back into the notch situated between the plates N+6 and N+7, the other end being welded on the plate N+8.

According to one embodiment, the transverse cross-section of the conductors of the winding is round or square or rectangular.

According to one embodiment, a notch insulator in the form of an "S" is installed around conductors of the winding.

The invention also relates to a starter for a motor vehicle equipped with a rotary electrical machine according to the invention.

BRIEF DESCRIPTION OF THE DRAWINGS

The invention will be better understood by reading the following description and examining the figures which accompany it. These figures are provided purely by way of illustration but in no way limit the invention. They show.

Elements which are identical, similar or analogous retain the same references from one figure to another.

DESCRIPTION OF EMBODIMENTS OF THE INVENTION

Figure 3:
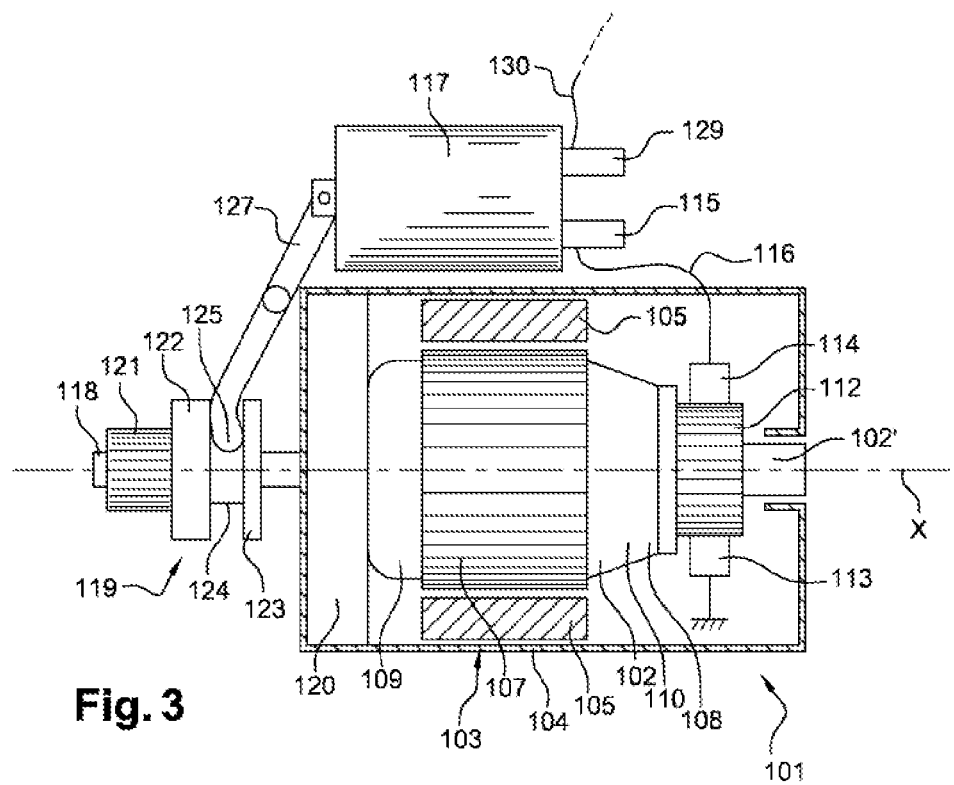
FIG. 3: a schematic representation of a starter equipped with a rotor wound according to the invention.

FIG. 3 shows a schematic representation of a starter 101 for a motor vehicle combustion engine. This direct current starter 101 comprises an electric motor which comprises firstly a rotor 102, also known as an armature, fitted on a metal shaft 102' with an axis X, and secondly a stator 103, which is also known as an inductor, installed around the rotor 102 with the presence of an air gap. This stator 103 comprises a metal head 104 which supports a magnetised structure 105 with permanent magnetisation or induced magnetisation. According to one example, the magnetised structure can be constituted by ferrite magnets which have radial magnetisation. The rotor 102, which has an annular form, comprises a rotor body 107 and a winding 108 which is wound in notches in the rotor body 107. In the example illustrated, the rotary electrical machine formed by the starter 101 is of the type with six poles. On both sides of the rotor body 107, the winding 108 forms a front chignon 109 and a rear chignon 110.

At the rear, the rotor 102 is provided with a collector 112 comprising a plurality of contact parts, in this case electrically conductive plates such as copper plates, which are connected electrically to the conductive elements, formed in the example concerned by wires of the winding 108. The plates of the collector are supported by a support made of plastic material which is integral with the shaft. For good resistance to temperature, the support of the collector is made of thermosetting plastic material, such as a thermo-setting phenolic plastic material, for example Bakelite. A group of brushes 113 and 114, which in this case is radial, is provided for the electrical supply of the winding 108, one of the brushes 113 being connected to the ground of the starter 101, and another one of the brushes 114 being connected to an electric terminal 115 of a contactor 117 via a wire 116. There are for example four or six brushes for a "Stop and Start" application. The brushes 113 and 114 rub on the plates of the collector 112 when the rotor 102 is rotating, thus permitting the supply of the winding 108 of the rotor 102 by switching of the electric current into the conductors of the rotor 102.

The starter 101 additionally comprises a launcher assembly 119 which is fitted in a sliding manner on a drive shaft 118 which is designed to be rotated around the shaft X by the rotor 102, when the winding 108 is being supplied electrically. A speed reducer assembly 120 is interposed between the shaft of the rotor 102' and the drive shaft 118. in a known manner. As a variant, the starter 101 can be of the "Direct Drive" type, without a speed reducer. The shaft 102' is thus distinct from, or combined with, the shaft 102' of the rotor 102. The launcher assembly 119 comprises a drive element 121 which is designed to engage on a drive unit of the combustion engine, not represented. According to one embodiment, this drive element 121 is a pulley which receives a belt which co-operates with a pulley of the crankshaft of the internal combustion engine.

According to another embodiment, the pulley 121 can be replaced by a gear element, mostly a pinion, which is configured to rotate a toothed starter ring which is connected in a rigid or resilient manner to the crankshaft of the combustion engine. The launcher assembly 119 also comprises a free wheel 122 and a driver 123 which defines together with the free wheel 122 a channel 124 to receive the end 125 of a fork 127. The free wheel 122, such as a free wheel with rollers, is interposed between the pinion 121 and the driver 123 which has on its inner periphery grooves with a helical form which engage in a complementary manner with grooves with a helical form provided on the outer periphery of the shaft 118. This fork 127 is produced for example by moulding of a plastic material. In a known manner, this fork 127 has an intermediate pivoting point and an upper end which is connected in an articulated manner to a rod which is connected to the mobile core of an electromagnetic contactor 117. This mobile core is designed to act on a thruster which supports a mobile contact in the form of a small plate which is designed to come into contact with the terminal 115 connected to the brush 1, and with a terminal 129 which is connected via an electrical connection element, in particular a wire 130, to an electrical supply of the vehicle, and in particular a battery.

For further details on the contactor 117 and in general on the starter, reference will be made for example to document U.S. Pat. No. 7,375,606, in the knowledge that the head of the electric motor belongs to the housing of the starter. The fork 127 is thus activated by the mobile core of the contactor 117 in order to displace the launcher assembly 119 relative to the drive shaft 118, according to the axis X, between a first position in which the mobile contact of the contactor 117 is in contact with the terminals 115, 129, and supplies electrically the winding 108 of the rotor 102 in order to make the rotor 102 rotate and to drive the drive unit of the combustion engine by means of the drive unit 121, and a second position in which the launcher assembly 119 is disengaged from the drive unit of the combustion engine, and the mobile contact is disengaged from the terminals 115, 129.

Figure 4:
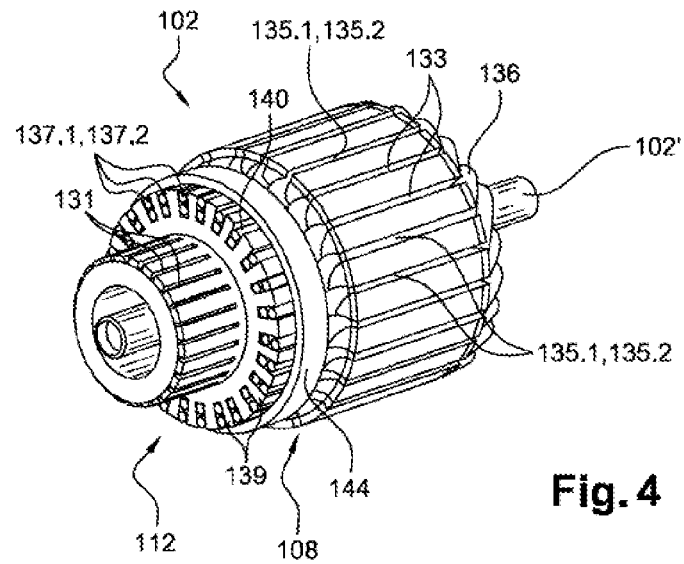
FIG. 4: an overall view in perspective of a rotor wound according to the invention.
Figure 5:
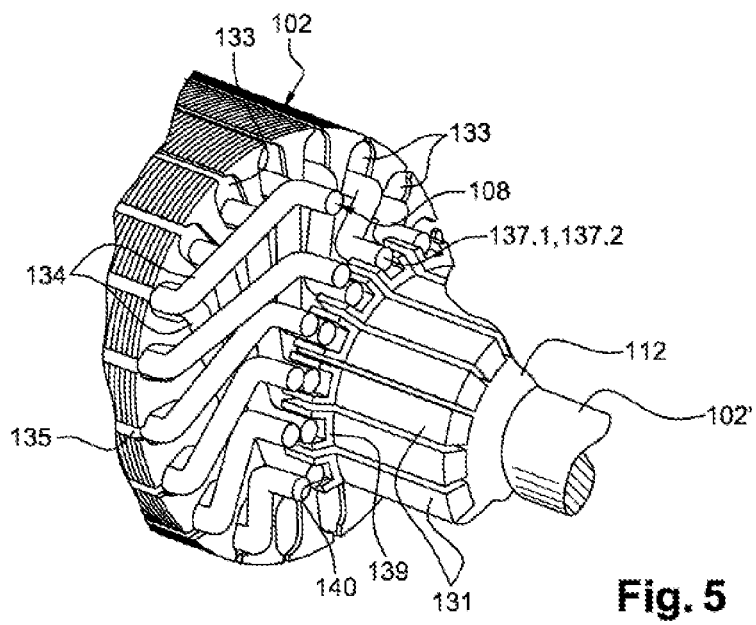
FIG. 5: a partial view in perspective of the rotor wound according to the principle of the invention, representing more particularly the ends of the conductors connected to the plates of the collector.

FIGS. 4 and 5 show the rotor 102 fitted on the shaft 102' which supports the collector 112 of the "drum" type. This collector 112 has the electrically conductive plates with the reference 131 which extend longitudinally side by side on its outer periphery. The rotor 102 also has the notches 133 which are provided longitudinally in the body in the form of the set of metal plates of the rotor 102. In order to form the winding 108, at least two conductors 134, the ends of which are welded on the plates 131, are inserted inside each of these notches 133. According to one embodiment the plates 131 and the conductors 134 are made of copper.

More particularly, each conductor 134 is in this case covered with an electrically insulating layer such as enamel, and has only two arms 135.1, 135.2 which are connected by a base 136 (shown in FIG. 4) such as to form a "U"-shaped conductor Distal ends 137.1, 137.2 of a single conductor are constituted by a distal end of each arm 135.1, 135.2. The two arms 135.1, 135.2 of each of the conductors 134, the distal ends 137.1, 137.2 of which are welded on the plates 131, are inserted inside the notches 133 on two distinct layers, i.e. the upper layer and the lower layer. In other words, each of the conductors 134 is inserted inside only two of the notches 133. If one of the arms 135.1, 135.2 is positioned on the lower layer, then the other arm 135.1, 135.2 is situated on the upper layer or vice versa. The transverse cross-section of the conductors 134 of the winding can be round or square or rectangular.

At the ends of the plates 131 which face towards the armature 102, there are provided shoulders 139 which are arranged in a ring around the collector 112 in radial extension of the plates 131. In the median part of the shoulders 139 there are provided indentations 140, the form of a truncated "V" of each of which can cover all or at least part of the end of the conductor 134 which belongs to the lower layer of the conductors. The conductors are welded on the corresponding shoulder 139.

Figure 6:
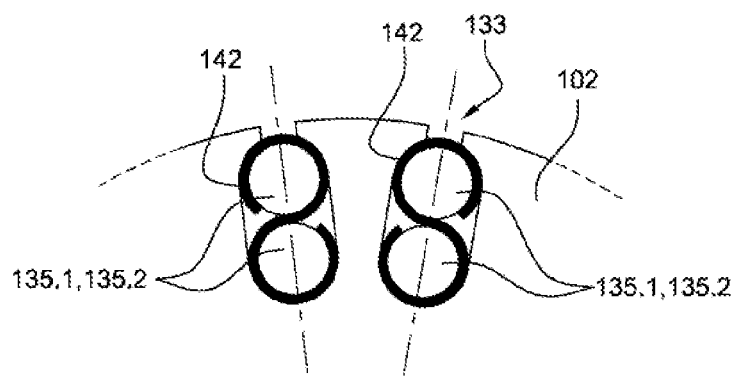
FIG. 6: a schematic representation of the two layers of conductors positioned inside the notches of the rotor, showing the notch insulator in the form of an "S"

FIG. 6 represents the insulating notch 142 positioned around the arms of the conductors 134, which in this case has the form of an "S". This insulator 142 makes it possible not to damage the conductors (which are covered with a thin layer of enamel) when they are fitted in the set of metal plates of the rotor 102, which by definition contain burr and are grooved for force fitting of the set of metal plates of the rotor 102. It also insulates the conductors 134 electrically relative to the set of metal plates connected to the ground via the housing of the starter 101. In addition, the play between the insulator 142 and the edges of the notches 133 is filled by an impregnation varnish.

A hoop 144 which is made of electrically insulating material and can be seen in FIG. 4 is attached around the ends of the conductors 134. This hoop 144 assures radial retention of the conductors 134, thus preventing the effects of the centrifugal force from being exerted on the welds of the ends 137.1, 137.2 of the conductors between one another and on the plates 131 of the collector.

The distance between the two arms 135.1, 135.2 of a single conductor at the level of the notches 133 is known as the notch pitch k. If one of the arms 135.1, 135.2 of a conductor is engaged inside the notch N, and the other arm is engaged in the notch N+k, the notch pitch is equal to k. In other words, the notch pitch k is equal to the number of notches 133 which separate the two notches 133 which receive the arms 135.1, 135.2 of a single conductor 134 plus one.

Similarly the distance between the two ends 137.1, 137.2 of a single conductor at the level of the plates is known as the plate pitch 1. If one of the ends 137.1 of a conductor 134 is welded on the plate M, and the other end is welded on the plate M+1, the plate pitch is equal to 1. In other words, the plate pitch 1 is equal to the number of plates 131 which separate the two plates 131 on which the ends of a single conductor 134 plus one are welded.

Figure 7:
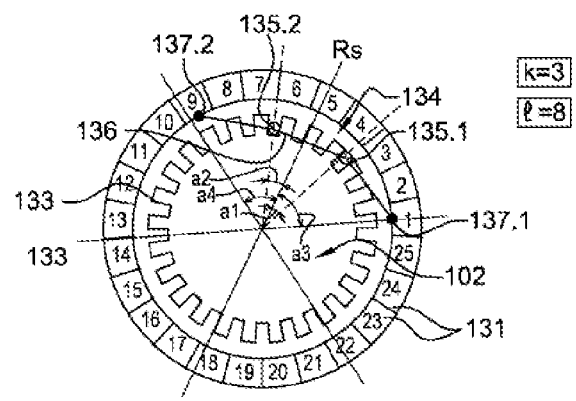
FIG. 7: a schematic representation of the notches and plates of a rotor wound according to the invention, showing the connection of a conductor according to a notch pitch of k=3 and a plate pitch of 1=8.

FIG. 7 shows a rotor 102 according to the invention comprising 25 plates numbered from 1 to 25 and 25 corresponding notches. According to the invention, the rotor 102 is wound according to a notch pitch k of 3 and a plate pitch 1 of 8. This rotor is fitted inside a stator comprising three pairs of poles. According to one embodiment, these are three pairs of magnets with radial action of the North South type distributed circumferentially in an alternating manner. When the rotor rotates inside the stator, for a conductor 134 which is connected to a given plate 131 of the collector, variation occurs in the magnetic field produced by the magnets.

Preferably, each conductor 134 of the winding is symmetrical relative to a radius of symmetry Rs of the rotor 102. In other words, the angle a1 formed by the radius Rs and the radius of the rotor 102 which passes via the transverse cross section of an arm 135.1 of the conductor 134 is equal to the angle a2 formed by the radius Rs and the radius of the rotor which passes via the transverse cross-section of the other arm 135.2 of the conductor. In addition, the angle a3 formed by the radius Rs and the radius of the rotor 102 which passes via the transverse cross-section of one of the ends of the conductor is equal to the angle a4 formed by the radius Rs and the radius of the rotor 102 which passes via the other end of the conductor 134.

Figure 1:
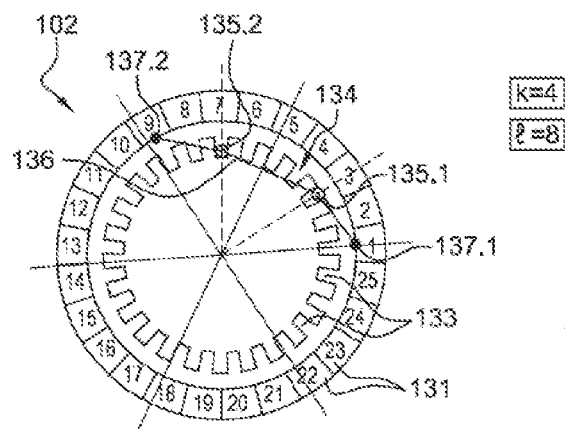
FIG. 1: a schematic representation of the notches and plates of a rotor, showing the connection of a conductor of the winding according to the principle of the prior art.

For this purpose, according to one characteristic, in comparison with the known rotor structures (cf FIG. 1 in which the notches 133 are situated opposite the plates 131), the notches 133 are offset relative to the plates 131, such that each notch 133 is situated opposite a junction between two plates 131.

Thus, for this configuration (k=3, 1=8), if one end 137.1 of a conductor 134 is welded on the plate N, one of its arms 135.1 passes into the notch situated between the plates N+2 and N+3, and its other arm 135.2 passes back into the notch situated between the plates N+5 and N+6, the other end 137.2 being welded on the plate N+8. An example of connection of a conductor 134 is given in FIG. 7 for N=1, its end 137.1 being welded on the plate 1, one of its arms 135.1 passing into the notch situated between the plate numbers 3 and 4, and its other arm 135.2 passing back into the notch situated between the plate numbers 6 and 7, the other end 137.2 being welded on plate number 9.

Figure 9:
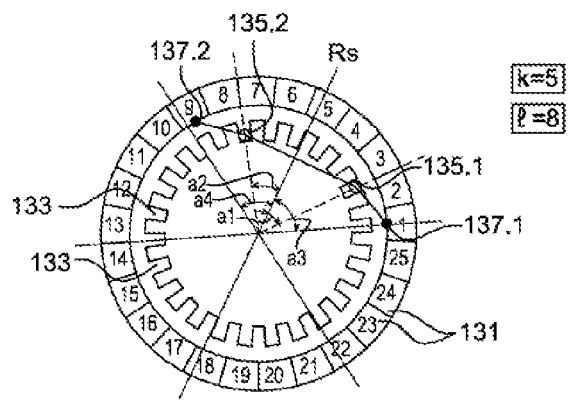
FIG. 9: a schematic representation of the notches and plates of a rotor wound according to the invention, showing the connection of a conductor according to a notch pitch of k=5 and a plate pitch of 1=8.

FIG. 9 shows a variant embodiment of the invention in the rotor 102 is wound according to a notch pitch k of 5 and a plate pitch 1 of 8. In this variant, the symmetry is retained in the winding relative to the radius Rs, the notches 133 being offset relative to the plates 131 such that once again each is opposite a junction between two plates 131.

Thus, for this configuration (k=5, 1=8), if one end 137.1 of a conductor 134 is welded on the plate N, one of its arms 135.1 passes into the notch 133 situated between the plates N+1 and N+2, and its other arm 135.2 passes back into the notch 133 situated between the plate N+6 and the plate N+7, and the other end will be welded on the plate N+8. An example of connection of a conductor 134 is given in FIG. 9 for N=1, its end 137.1 being welded on the plate 1, one of its arms 135.1 passing into the notch situated between the plates 2 and 3, and its other arm 135.2 passing back into the notch situated between the plates 7 and 8, the other end being welded on the plate 9.

Figure 8A:
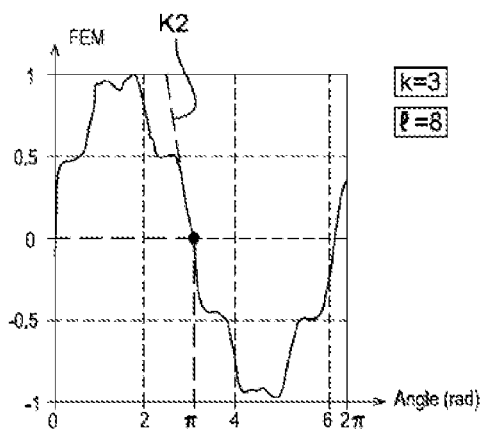
FIGS. 8*a*-8*b*: graphs showing respectively the electromotive force EMF normalised according to the angle of rotation of the rotor, as well as the amplitude of different harmonics obtained for the rotor in FIG. 7.
Figure 10A:
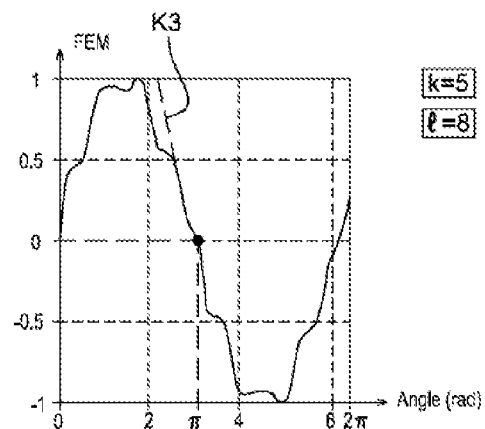
FIGS. 10*a*-10*b*: graphs showing respectively the electromotive force EMF normalized according to the angle of rotation of the rotor, as well as the amplitude of different harmonics obtained for the rotor in FIG. 9.

FIGS. 8a and 10a show respectively the electromotive forces EMF obtained, according to the angle of rotation for the windings produced according to FIG. 7 (k=3 and 1=8) and FIG. 9 (k=5, 1=8). In comparison with the curve in FIG. 2a, it can be seen that the stage P of the switching area has disappeared, and the curves in FIGS. 8a and 10a have in this area an abrupt linear form without a point of inflection, thus making it possible to facilitate the switching at the level of the conductors 134 of the rotor 102, provided that preferably angular offsetting of several degrees of the inductor relative to the brushes is applied (and vice versa).

According to one embodiment, the gradients K2 and K3 of the curves in FIGS. 8a and 10a preferably consist of between 1.5 and 100 times the amplitude of the signal of the electromotive force EMF, according to the angle for pi radians of variation of angle.

Figure 2A:
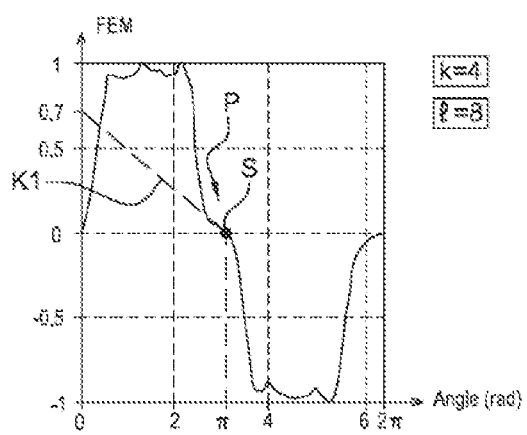
FIGS. 2*a*-2*b*: graphs showing respectively the electromotive force EMF normalised according to the angle of rotation of the rotor, as well as the amplitude of different harmonics obtained for a rotor according to the prior art.

This gradient is therefore much steeper than that K1 of the stage P of the curve in FIG. 2a, which consists of between 0 and 1 times the amplitude of the signal of the electromotive force EMF, according to the angle for pi radians of variation of angle (this is approximately 0.7 in FIG. 2a).

Figure 11:
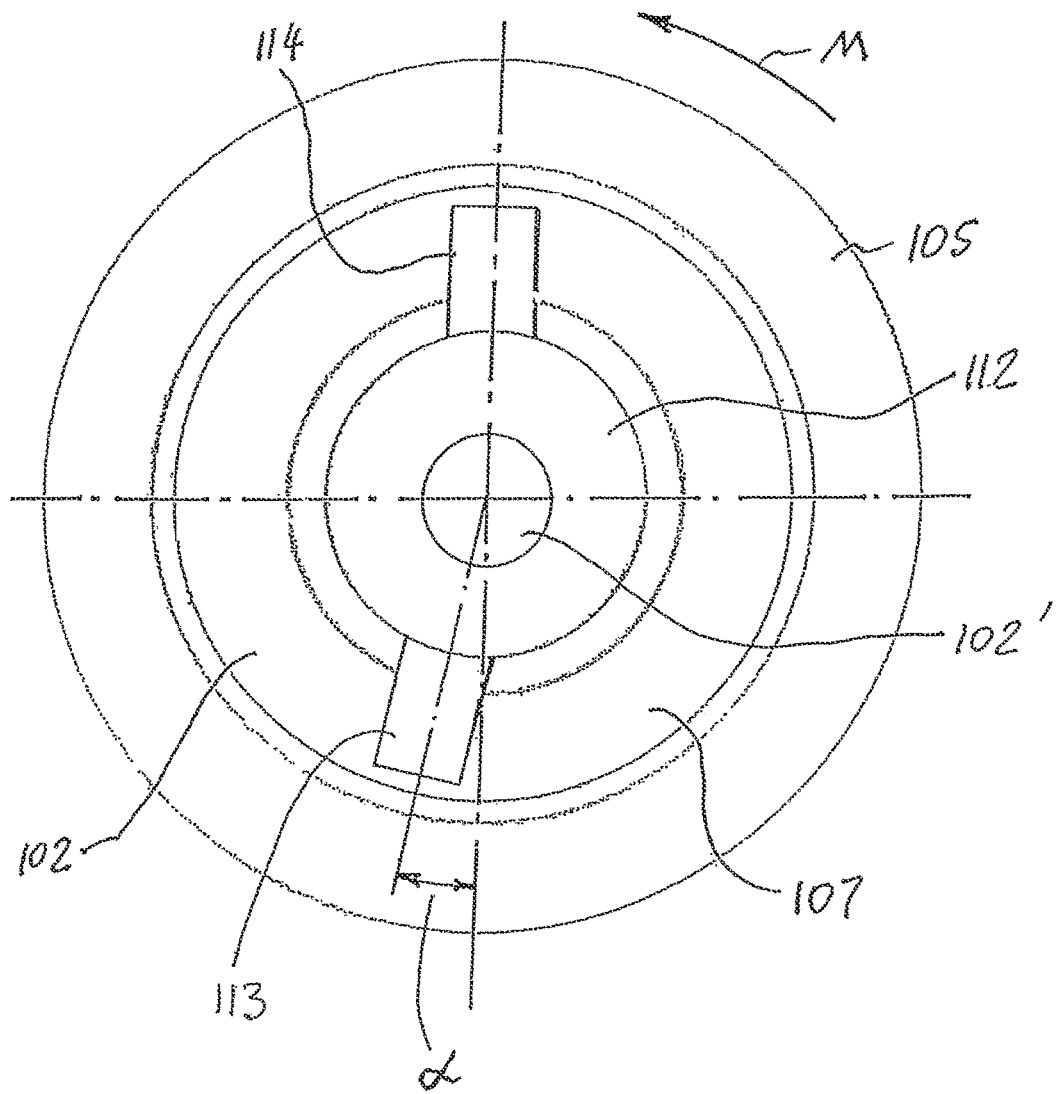
FIG. 11: a schematic rear view of the starter equipped with the rotor according to the present invention.

In addition, an angular offsetting α of the brushes 113, 114, relative to the stator 103 is between 1 and 45 electric degrees, i.e. between ⅓ and 15 mechanical degrees for a machine with 3 pairs of poles, as best shown in FIG. 11. This angular offsetting of the brushes 113, 114 is applied rearwards, i.e. in the direction opposite that of the direction M of the rotation of the armature 102, since a motor and not a generator is involved. In other words, the brushes 113, 114 disposed not diametrically opposite to each other. The starter 101 can rotate in clockwise or anticlockwise direction. FIG. 11 shows just an exemplary embodiment corresponding to the clockwise rotation of the pinion 121 (determined when facing the pinion 121). In case of the counterclockwise rotation of the pinion 121, the brushes 113, 114 will be offset in a direction opposite to one illustrated in the drawing FIG. 11.

Figure 2B:
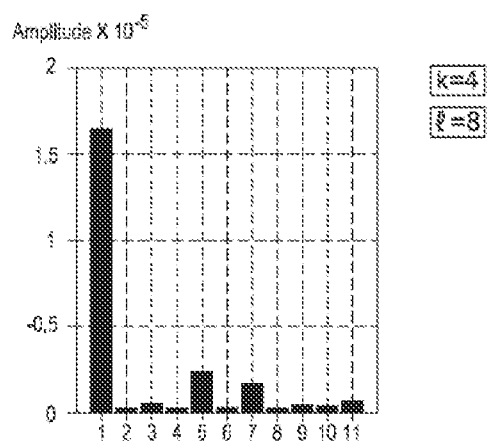
Figure 8B:
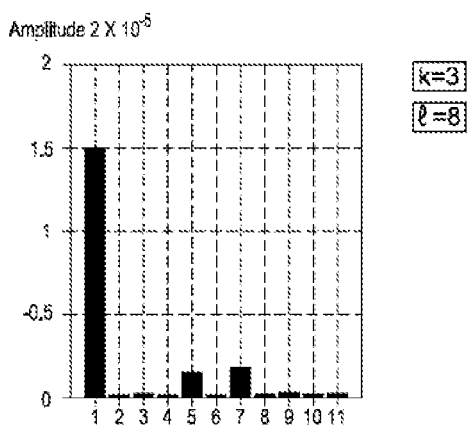
Figure 10B:
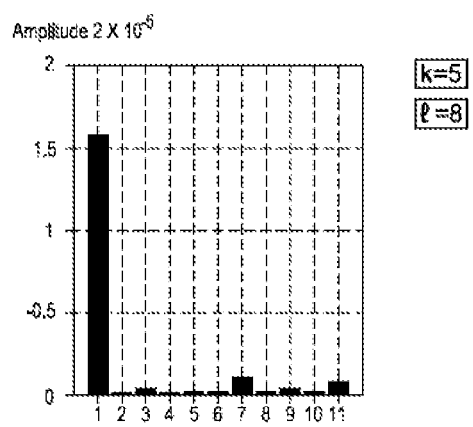

In addition, it can be noted that the amplitudes of the $5^{th}$ and $7^{th}$ harmonics obtained with winding, having a notch pitch of k=5 (cf FIG. 10b), are smaller than those of the harmonics obtained for a winding having a notch pitch of k=4 (cf FIG. 2b) or K=3 (cf FIG. 8b). The winding produced with k=5 thus corresponds to the optimum configuration of the invention. In all cases (K=3 or 5), the armature is wound such as to benefit from wave forms with an abrupt linear form in the switching region (EMF equal to 0 in FIGS. 8a and 10a). The angular width in the region opposite the inductor poles (maximum EMF in the curves in FIGS. 2a, 8a and 10a) becomes smaller with K=3 or 5. The decrease of the angular width is a disadvantage, but a greater advantage is obtained as a result of the ease of improvement of the switching by offsetting angularly an abrupt linear profile in the switching region, rather than a profile with a platform. The notches are offset angularly relative to the plates.

The invention makes it possible to establish conditions similar to those obtained with an inductor of the Halbach type with a local sine in the switching area, as described in document FR A 2 910 192, to which reference will be made for further details, but whilst maintaining a single inductor with ferrites with radial magnetisation. Reference is then made to a Halbach system of the "electric" (inductor) type rather than"magnetic" (product), with an advantage in terms of simplicity of the inductor, since the adapted armature is no longer complicated to produce.

It will be appreciated that as a variant, the rotary electrical machine, such as a starter 101 for a motor vehicle, comprises a stator 103 comprising a magnetised structure with permanent magnetisation 105 of the Halbach type. Use is made of a structure of the Halbach type which extends according to a circumference of the stator in order to increase the magnetic forces. More specifically, as a variant, the six poles belong to a structure of the Halbach type described in document FR A 2910 192. Thus, between two consecutive magnets with radial action (direction of the radial magnetic field), three permanent magnets are arranged, as follows:

one magnet having a substantially orthoradial direction of magnetisation perpendicular to the radial direction; and
on both sides of this magnet 56, two magnets having a direction of magnetisation different from the radial and orthoradial directions. In the example considered, the direction of magnetisation is substantially regular within each magnet, and forms together with the radial direction an angle of approximately 45°.

For further details, reference will be made to FIGS. 2 and 3 of this document FR A 2910 192, in the knowledge that the rotor passes through the stator as can be seen in FIG. 3. When the rotor rotates inside the stator, for a given plate 131 of the collector, variation of the magnetic field occurs, induced by the magnets. A structure of this type makes it possible to concentrate the magnetic energy towards the air gap between the rotor 102 and the stator, which corresponds to a significant reduction of the induction on the exterior of the magnetised structure, and a significant increase of the induction towards the interior. According to one embodiment, the magnets are made of rare earth, for example of a neodymium iron boron (NdFeB) structure, or as a variant of a samarium cobalt structure, in order to increase the magnetic forces.

The invention claimed is:

1. A rotary electrical machine comprising a wound rotor (102) having an axis of rotation (X), the rotor comprising:
a stator (103) comprising a magnetised structure with permanent or induced magnetisation which extends according to a circumference of the stator (103);
brushes (113, 114) configured to permit the electrical supply to the rotor by switching of the electric current in the conductors of the rotor (102), the brushes (113, 114) being offset angularly relative to the stator (103);
a collector (112) comprising a set of plates (131) which are designed to enter into co-operation with the brushes (113, 114);
notches (133) which are provided longitudinally on the outer periphery of the rotor (102); and
a winding (108) which is formed by an assembly of conductors (134), each conductor (134) comprising two arms (135.1, 135.2) each having a distal end (137.1, 137.2), the two arms (135.1, 135.2) being connected to one another by a base (136) so as to form a U-shaped conductor;
the arms (135.1, 135.2) of a single conductor being introduced into the notches (133) according to a notch pitch k;
the distal ends (137.1, 137.2) of a single conductor being welded on the plates (131) according to a plate pitch 1;
a curve representing the electromotive force (EMF) generated by the rotor (102) according to an angle of rotation of the rotor has an abrupt linear form without a point of inflection (S) in a switching region; and
the notches (133) being offset angularly relative to the plates (131), such that each of the notches (133) is situated opposite a junction between two plates;
the notch pitch k is not equal to the plate pitch 1;
the abrupt linear form of the curve is characterized by a gradient (K2, K3) of between 1.5 and 100 times the amplitude of the electromotive force signal (EMF), according to the angle for pi radians of variation of angle;
the angular offsetting of the brushes is between 1 and 45 electric degrees.

2. The machine according to claim 1, wherein, for a configuration with 6 poles and 25 notches, the notch pitch k is equal to 3 or 5, and the plate pitch 1 is equal to 8.

3. The machine according to claim 2, wherein each conductor (134) of the winding has radial symmetry relative to a radius of the rotor (102), known as a radius of symmetry (Rs).

4. The machine according to claim 3, wherein:
an angle (a1) formed by the radius of symmetry (Rs) and the radius of the rotor (102) which passes via a transverse cross-section of an arm (135.1) of the conductor (134) is equal to an angle (a2) formed by the radius (Rs) and the radius of the rotor (102) which passes via the transverse cross-section of the other arm (135.2) of the conductor (134); and
an angle (a3) formed by the radius of symmetry (Rs) and the radius of the rotor (102) which passes via the transverse cross-section of one of the ends of the conductor (134) is equal to the angle (a4) formed by the radius (Rs) and the radius of the rotor (102) which passes via the transverse cross-section of the other end of the conductor (134).

5. The machine according to claim 4, wherein, for a winding which has a notch pitch k of 3 and a plate pitch 1 of 8, if one end (137.1) of a conductor (134) is welded on the plate N, one of its arms (135.1) passes into the notch (133) situated between the plates N+2 and N+3, and its other arm (135.2) passes back into the notch (133) situated between the plates N+5 and N+6, the other end (137.2) being welded on the plate N+8.

6. The machine according to claim 4, wherein, for the winding configuration which has a notch pitch k of 5 and a plate pitch of 8, if one end (137.1) of a conductor (134) is welded on the plate N, one of its arms (135.1) passes into the notch (133) situated between the plates N+1 and N+2, and its other arm (135.2) passes back into the notch (133) situated between the plate N+6 and the plate N+7, the other end being welded on the plate N+8.

7. The machine according to claim 6, wherein the transverse cross-section of the conductors (134) of the winding is one of round, square and rectangular.

8. The machine according to claim 7, wherein a notch insulator (142) in the form of an "S" is installed around conductors (134) of the winding.

* * * * *